(12) United States Patent
Wu et al.

(10) Patent No.: US 10,944,507 B2
(45) Date of Patent: Mar. 9, 2021

(54) SIGNAL TRANSMISSION METHOD AND BASE STATION

(71) Applicant: Huawei Technologies Co., Ltd., Shenzhen (CN)

(72) Inventors: Yu Wu, Chengdu (CN); Xiaolong Zhu, Shanghai (CN); Wei Chen, Shanghai (CN); Rong Wan, Shenzhen (CN); Shuai Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/448,716

(22) Filed: Jun. 21, 2019

(65) Prior Publication Data

US 2019/0312673 A1 Oct. 10, 2019

Related U.S. Application Data (63) Continuation of application No. PCT/CN2016/111809, filed on Dec. 23, 2016.

(51) Int. Cl.
| | |
|---|---|
| *H04L 1/00* | (2006.01) |
| *H04W 72/04* | (2009.01) |
| *H04W 88/08* | (2009.01) |
| *H04B 7/06* | (2006.01) |
| *H04L 5/00* | (2006.01) |

(52) U.S. Cl.
CPC ............ *H04L 1/0051* (2013.01); *H04B 7/06* (2013.01); *H04W 72/0453* (2013.01); *H04W 88/085* (2013.01); *H04L 5/0007* (2013.01)

(58) Field of Classification Search
None
See application file for complete search history.

(56) References Cited

U.S. PATENT DOCUMENTS

| | | | | |
|---|---|---|---|---|
| 2009/0067522 A1* | 3/2009 | Kwak | ................... | H04L 5/0023 375/260 |
| 2009/0074086 A1* | 3/2009 | Murakami | ............ | H04L 27/265 375/260 |
| 2009/0262845 A1* | 10/2009 | Park | .................... | H04L 25/0204 375/260 |

(Continued)

FOREIGN PATENT DOCUMENTS

| | | |
|---|---|---|
| CN | 101771437 A | 7/2010 |
| CN | 102148634 A | 8/2011 |

(Continued)

*Primary Examiner* — Andrew C Oh
(74) *Attorney, Agent, or Firm* — Slater Matsil, LLP (57) ABSTRACT

A signal transmission method is performed by a base station. The method includes: determining, a first carrier signal that is to be sent in a first cell on a first carrier and a second carrier signal that is to be sent in a second cell on a second carrier; mapping, the first carrier signal and the second carrier signal to N physical ports of an RRU, so that within a same OFDM symbol, a type B symbol used to transmit a pilot in the first carrier signal and a type B symbol used to transmit a pilot in the second carrier signal are mapped to different physical ports, and a total power of signals sent on each of N physical channels is not greater than a rated power of the RRU; and sending, the first carrier signal and the second carrier signal through the N physical ports.

15 Claims, 4 Drawing Sheets

(56) References Cited

U.S. PATENT DOCUMENTS

| | | | |
|---|---|---|---|
| 2010/0002787 A1* | 1/2010 | Choi | H04L 5/005 375/260 |
| 2010/0020890 A1* | 1/2010 | Choi | H04L 25/0232 375/260 |
| 2010/0091680 A1* | 4/2010 | Chun | H04L 5/0023 370/252 |
| 2011/0009137 A1* | 1/2011 | Chung | H04L 5/0048 455/501 |
| 2011/0170496 A1 | 7/2011 | Fong et al. | |
| 2012/0039320 A1* | 2/2012 | Lemson | H04B 10/25753 370/338 |
| 2012/0269278 A1* | 10/2012 | Onggosanusi | H04W 72/1294 375/267 |
| 2013/0107975 A1* | 5/2013 | Castelain | H04L 25/0202 375/260 |
| 2013/0128810 A1* | 5/2013 | Lee | H04W 84/042 370/328 |
| 2013/0258896 A1* | 10/2013 | Park | H04W 72/042 370/252 |
| 2014/0176366 A1* | 6/2014 | Fischer | H04W 64/006 342/374 |
| 2014/0204790 A1* | 7/2014 | Li | H04W 24/10 370/252 |
| 2014/0211713 A1* | 7/2014 | Ito | H04L 5/0053 370/329 |
| 2014/0219317 A1 | 8/2014 | Jeong | |
| 2015/0249972 A1 | 9/2015 | You et al. | |
| 2015/0318908 A1* | 11/2015 | Ko | H04B 7/0617 375/267 |
| 2016/0212747 A1* | 7/2016 | Effenberger | H04L 27/00 |
| 2016/0373226 A1* | 12/2016 | Wang | H04L 27/2613 |
| 2017/0230952 A1* | 8/2017 | Choi | H04L 5/0044 |
| 2017/0280453 A1* | 9/2017 | Choi | H04W 72/0453 |
| 2018/0309549 A1* | 10/2018 | Papadopoulos | H04L 5/0048 |

FOREIGN PATENT DOCUMENTS

| | | |
|---|---|---|
| CN | 102611489 A | 7/2012 |
| CN | 102792616 A | 11/2012 |
| CN | 103281768 A | 9/2013 |
| CN | 103378890 A | 10/2013 |
| CN | 105322992 A | 2/2016 |
| CN | 106161311 A | 11/2016 |
| JP | 2010258693 A | 11/2010 |
| JP | 2014529227 A | 10/2014 |
| JP | 2016032266 A | 3/2016 |
| JP | 2016506656 A | 3/2016 |
| WO | 2010122876 A1 | 10/2010 |

\* cited by examiner

100

```
┌─────────────────────────────────────────────────────────────┐
│ A base station determines a first carrier signal that is to be sent in a │
│ first cell on a first carrier and a second carrier signal that is to be sent │ ∿ S110
│              in a second cell on a second carrier            │
└─────────────────────────────────────────────────────────────┘
                              │
┌─────────────────────────────────────────────────────────────┐
│ The base station maps the first carrier signal and the second carrier │
│ signal to N physical ports of a remote radio unit RRU, so that within │
│ a same orthogonal frequency division multiplexing OFDM symbol, a │
│ type type B symbol used to transmit a pilot in the first carrier signal │
│ and a type B symbol used to transmit a pilot in the second carrier │ ∿ S120
│ signal are mapped to different physical ports, and a total power of │
│ asignals sent on each of N physical channels is not greater than a │
│                       rated power of the RRU                │
└─────────────────────────────────────────────────────────────┘
                              │
┌─────────────────────────────────────────────────────────────┐
│ The base station sends the first carrier signal and the second carrier │ ∿ S130
│            signal through the N physical ports              │
└─────────────────────────────────────────────────────────────┘
```

SIGNAL TRANSMISSION METHOD AND BASE STATION

CROSS-REFERENCE TO RELATED APPLICATIONS

This application is a continuation of International Patent Application No. PCT/CN2016/111809, filed on Dec. 23, 2016, the disclosure of which is hereby incorporated by reference in its entirety.

TECHNICAL FIELD

Embodiments of this application relate to the field of radio communications, and more specifically, to a signal transmission method and a base station in the field of radio communications.

BACKGROUND

A multi-antenna transmission technology means that data is sent and received at a transmit end and a receive end by using a plurality of antennas. The multi-antenna transmission technology can make full use of space resources, increase an effective bandwidth of a radio channel, greatly improve a capacity of a communications system, and increase a transmission rate of a local area network. Currently, a multi-antenna technology has been introduced as an important feature into the 3rd generation partnership project (3GPP) long term evolution (LTE) technical specifications. Today, with increasing development of network applications, a multi-antenna wireless network device becomes a better choice.

In an existing technical solution, if a power cannot double as multi-carrier 2T2R (2 transmit 2 receive) evolves to 4T4R, for example, when 2T2R with 2×40 W evolves to 4T4R, if a power cannot reach 4×40 W due to costs, but can only be set to 4×20 W, a network coverage area may be reduced. The network coverage area can be maintained by increasing a power of a cell-specific reference signal (CRS), but an output power of a multi-carrier signal transmitted over a radio frequency channel in a network may exceed a capability of a radio frequency power amplifier.

However, to ensure that the output power of the radio frequency channel does not exceed the capability of the radio frequency power amplifier, a power of Pb in a 4T network needs to be decreased. As a result, the output power of the radio frequency channel is decreased, causing relatively low power utilization, and affecting data channel performance.

SUMMARY

Embodiments of this application provide a signal transmission method and a base station, to increase an output power of a radio frequency channel, and improve power utilization.

According to a first aspect, an embodiment of this application provides a signal transmission method. The method includes determining, by a base station, a first carrier signal that is to be sent in a first cell on a first carrier and a second carrier signal that is to be sent in a second cell on a second carrier. The method also includes mapping, by the base station, the first carrier signal and the second carrier signal to N physical ports of a remote radio unit (RRU), so that within a same orthogonal frequency division multiplexing (OFDM) symbol, a type B symbol that is used to transmit a pilot in the first carrier signal and a type B symbol that is used to transmit a pilot in the second carrier signal are mapped to different physical ports, and a total power of signals sent on each of N physical channels is not greater than a rated power of the RRU. The method also includes sending, by the base station, the first carrier signal and the second carrier signal through the N physical ports.

According to the signal transmission method provided in this embodiment of this application, during an upgrade from 2T to 4T, type B symbols that are used to transmit a pilot position in a plurality of carriers are transmitted in a staggered manner within a same OFDM symbol, thereby increasing an output power of a radio frequency channel and improving power utilization on a premise that the output power of the radio frequency channel does not exceed a capability of a radio frequency power amplifier and a network coverage area remains unchanged.

It should be understood that, in the 3GPP LTE protocol, a type A symbol represents a symbol that does not have a pilot position, and a type B symbol represents a symbol that has a pilot position.

It should be further understood that the type B symbol may further be classified into a type B symbol that is used to transmit a pilot and a type B symbol that is not used to transmit a pilot, and a power of the type B symbol that is used to transmit a pilot is higher than that of the type B symbol that is not used to transmit a pilot.

It should be further understood that, in this embodiment of this application, the first carrier signal is a signal that is to be sent in the first cell on the first carrier by the base station, and the second carrier signal is a signal that is to be sent in the second cell on the second carrier by the base station, where the first carrier is different from the second carrier.

It should be further understood that, this embodiment of this application may be applied to a multi-carrier multi-transmit antenna system. In this embodiment of this application, only two carriers are used as an example, but this application is not limited thereto.

With reference to the first aspect, in a first possible implementation of the first aspect, the first carrier signal corresponds to N antenna ports, and the second carrier signal corresponds to N antenna ports; and the mapping, by the base station, the first carrier signal and the second carrier signal to N physical ports of a remote radio unit RRU includes: mapping, by the base station, the N antenna ports corresponding to the first carrier signal and the N antenna ports corresponding to the second carrier signal to the N physical ports, so that within the same OFDM symbol, an antenna port for sending the type B symbol that is used to transmit a pilot in the first carrier signal and an antenna port for sending the type B symbol that is not used to transmit a pilot in the second carrier signal are mapped to a same physical port.

Optionally, the base station may preset a mapping relationship of the N antenna ports corresponding to the first carrier signal with the N physical ports and a mapping relationship of the N antenna ports corresponding to the second carrier signal with the N physical ports, so that within the same OFDM symbol, the antenna port for sending the type B symbol that is used to transmit a pilot in the first carrier signal and the antenna port for sending the type B symbol that is not used to transmit a pilot in the second carrier signal are mapped to the same physical port, and the first carrier and the second carrier are mapped to the N physical ports based on the preset mapping relationships. This is not limited in this embodiment of this application.

According to the signal transmission method provided in this embodiment of this application, during an upgrade from 2T to 4T, type B symbols that are used to transmit a pilot position in a plurality of carriers are transmitted in a staggered manner within a same OFDM symbol, thereby increasing an output power of a radio frequency channel and improving power utilization on a premise that the output power of the radio frequency channel does not exceed a capability of a radio frequency power amplifier and a network coverage area remains unchanged.

With reference to the first possible implementation of the first aspect, in a second possible implementation of the first aspect, N is 4, and the mapping, by the base station, the N antenna ports corresponding to the first carrier signal and the N antenna ports corresponding to the second carrier signal to the N physical ports includes: mapping, by the base station, the first antenna port of the first carrier signal and the fourth antenna port of the second carrier signal to the first physical port, mapping the third antenna port of the first carrier signal and the second antenna port of the second carrier signal to the second physical port, mapping the second antenna port of the first carrier signal and the third antenna port of the second carrier signal to the third physical port, and mapping the fourth antenna port of the first carrier signal and the first antenna port of the second carrier signal to the fourth physical port.

It should be understood that, according to pilot patterns of four antenna ports specified in the 3GPP LTE protocol, it can be learned that within one slot, for the antenna ports, type A symbols are sent on OFDM symbols numbered 2/3/5/6, and type B symbols are sent on OFDM symbols numbered 0/1/4, where for an antenna port 0 and an antenna port 1, type B symbols that are used to transmit a pilot are sent on the OFDM symbols numbered 0/4, and type B symbols that are not used to transmit a pilot are sent on the OFDM symbols numbered 1; for an antenna port 2 and an antenna port 3, type B symbols that are used to transmit a pilot are sent on the OFDM symbols numbered 1, and type B symbols that are not used to transmit a pilot are sent on the OFDM symbols numbered 0/4.

Optionally, the base station may determine, based on the pilot patterns of the four antenna ports, the mapping relationship of the N antenna ports corresponding to the first carrier signal with the N physical ports and the mapping relationship of the N antenna ports corresponding to the second carrier signal with the N physical ports, so that within the same OFDM symbol, the type B symbols that are used to transmit a pilot in the first carrier signal and the second carrier signal are sent through different physical ports.

For example, in a multi-carrier 4T scenario, the base station may preset the following: A physical port A corresponds to an antenna port 0 of the first carrier signal and an antenna port 3 of the second carrier signal, a physical port B corresponds to an antenna port 2 of the first carrier signal and an antenna port 1 of the second carrier signal, a physical port C corresponds to an antenna port 1 of the first carrier signal and an antenna port 2 of the second carrier signal, and a physical port D corresponds to an antenna port 3 of the first carrier signal and an antenna port 0 of the second carrier signal.

For another example, in a multi-carrier 4T scenario, the base station may preset the following: A physical port A corresponds to an antenna port 0 of the first carrier signal and an antenna port 2 of the second carrier signal, a physical port B corresponds to an antenna port 2 of the first carrier signal and an antenna port 0 of the second carrier signal, a physical port C corresponds to an antenna port 1 of the first carrier signal and an antenna port 3 of the second carrier signal, and a physical port D corresponds to an antenna port 3 of the first carrier signal and an antenna port 1 of the second carrier signal.

With reference to the first aspect, or the first or second possible implementation of the first aspect, in a third possible implementation of the first aspect, before the determining, by a base station, a first carrier signal that is to be sent in a first cell on a first carrier and a second carrier signal that is to be sent in a second cell on a second carrier, the method further includes: precoding, by the base station, a first baseband signal, to obtain the first carrier signal; and precoding, by the base station, a second baseband signal, to obtain the second carrier signal.

Optionally, both the first carrier signal and the second carrier signal may be precoded signals.

With reference to any one of the first aspect, or the first to the third possible implementations of the first aspect, in a fourth possible implementation of the first aspect, the base station is an evolved NodeB eNB in Long Term Evolution LTE.

According to a second aspect, an embodiment of this application provides a base station. The base station includes a determining unit, configured to determine a first carrier signal that is to be sent in a first cell on a first carrier and a second carrier signal that is to be sent in a second cell on a second carrier. The base station also includes a mapping unit, configured to map the first carrier signal and the second carrier signal that are determined by the determining unit to N physical ports of a remote radio unit (RRU), so that within a same orthogonal frequency division multiplexing (OFDM) symbol, a type B symbol that is used to transmit a pilot in the first carrier signal and a type B symbol that is used to transmit a pilot in the second carrier signal are mapped to different physical ports, and a total power of signals sent on each of N physical channels is not greater than a rated power of the RRU. The base station also includes a sending unit, configured to send the first carrier signal and the second carrier signal through the N physical ports mapped by the mapping unit.

According to the base station provided in this embodiment of this application, during an upgrade from 2T to 4T, type B symbols that are used to transmit a pilot position in a plurality of carriers are transmitted in a staggered manner within a same OFDM symbol, thereby increasing an output power of a radio frequency channel and improving power utilization on a premise that the output power of the radio frequency channel does not exceed a capability of a radio frequency power amplifier and a network coverage area remains unchanged.

With reference to the second aspect, in a first possible implementation of the second aspect, the first carrier signal corresponds to N antenna ports, and the second carrier signal corresponds to N antenna ports; and the mapping unit is specifically configured to: map the N antenna ports corresponding to the first carrier signal and the N antenna ports corresponding to the second carrier signal to the N physical ports, so that within the same OFDM symbol, an antenna port for sending the type B symbol that is used to transmit a pilot in the first carrier signal and an antenna port for sending a type B symbol that is not used to transmit a pilot in the second carrier signal are mapped to a same physical port.

With reference to the first possible implementation of the second aspect, in a second possible implementation of the second aspect, N is 4, and the mapping unit is specifically configured to: map the first antenna port of the first carrier signal and the fourth antenna port of the second carrier signal to the first physical port, map the third antenna port of the first carrier signal and the second antenna port of the second carrier signal to the second physical port, map the second antenna port of the first carrier signal and the third antenna port of the second carrier signal to the third physical port, and map the fourth antenna port of the first carrier signal and the first antenna port of the second carrier signal to the fourth physical port.

With reference to the second aspect, or the first or second possible implementation of the second aspect, in a third possible implementation of the second aspect, the base station further includes a processing unit, and the processing unit is configured to: before the first carrier signal that is to be sent in the first cell on the first carrier and the second carrier signal that is to be sent in the second cell on the second carrier are determined, precode a first baseband signal, to obtain the first carrier signal, and precode a second baseband signal, to obtain the second carrier signal.

With reference to any one of the second aspect, or the first to the third possible implementations of the second aspect, in a fourth possible implementation of the second aspect, the base station is an evolved NodeB eNB in Long Term Evolution LTE.

According to a third aspect, an embodiment of this application provides a base station, and the base station includes: a transceiver, a memory, and a processor. The transceiver, the memory, and the processor communicate with each other through an internal connection path, to transfer a control and/or data signal. The memory is configured to store an instruction, and the processor is configured to execute the instruction stored in the memory, and control the transceiver to send a signal. In addition, when executing the instruction stored in the memory, the processor can implement the method in the first aspect or any possible implementation of the first aspect.

According to a fourth aspect, this application provides a computer readable medium, configured to store a computer program, where the computer program includes an instruction used to perform the method in the first aspect or any possible implementation of the first aspect.

BRIEF DESCRIPTION OF THE DRAWINGS

FIG. 2 shows pilot patterns of four antenna ports according to an embodiment of this application;

DETAILED DESCRIPTION OF ILLUSTRATIVE EMBODIMENTS

The following describes technical solutions of the embodiments in this application with reference to accompanying drawings.

It should be understood that, the technical solutions of the embodiments of this application may be applied to the following communications systems, for example, a long term evolution (LTE) system and a future wireless communications system. The LTE system includes an LTE frequency division duplex (FDD) system, an LTE time division duplex (TDD) system, and the like. The LTE system is used as an example in the embodiments of this application for description.

User equipment (UE) in the embodiments of this application may be referred to as a terminal (terminal), a mobile station (MS), a mobile terminal (mobile terminal), or the like. The user equipment may communicate with one or more core networks through a radio access network (RAN). For example, the user equipment may be a mobile phone (also referred to as a "cellular" phone) or a computer having a mobile terminal, or the like. For example, the user equipment may also be a portable, pocket-sized, handheld, computer built-in, or in-vehicle mobile apparatus, which exchanges voice and/or data with the radio access network.

A base station in the embodiments of this application may be an evolved NodeB (eNB) in LTE, or may be a base station in a future wireless communications system.

A carrier signal in the embodiments of this application may be a cell-specific reference signal (CRS), a signal transmitted on a physical downlink shared channel (PDSCH), a signal transmitted on a packet broadcast control channel (PBCCH), a signal transmitted on a physical downlink control channel (PDCCH), a signal transmitted on a physical hybrid ARQ indicator channel (PHICH), a signal transmitted on a physical control format indicator channel (PCFICH), a primary synchronization signal (PSS), a secondary synchronization signal (SSS), or the like.

In the 3GPP LTE protocol, a type A symbol represents a symbol that does not have a pilot position, and a type B symbol represents a symbol that has a pilot position. The type B symbol may further be classified into a type B symbol that is used to transmit a pilot and a type B symbol that is not used to transmit a pilot, and a power of the type B symbol that is used to transmit a pilot is higher than that of the type B symbol that is not used to transmit a pilot. Pa represents a signal power offset of a resource element (RE) for sending a type A symbol relative to an RE for sending a pilot signal. For example, Pa=0 indicates that a signal power of the RE for sending a type A symbol is equal to a signal power of the RE for sending a pilot signal. Pa=−3 indicates that a signal power of the RE for sending a type A symbol is 3 dBm lower than a signal power of the RE for sending a pilot signal. Pb is an indicator value of a ratio of a power at which a signal is transmitted on the type A symbol to a power at which a signal is transmitted on the type B symbol. For example, when the ratio of the power at which a signal is transmitted on the type A symbol to the power at which a signal is transmitted on the type B symbol is 2, a corresponding indicator value Pb is 3; when the ratio of the power at which a signal is transmitted on the type A symbol to the power at which a signal is transmitted on the type B symbol is 4/3, a corresponding indicator value Pb is 2; when the ratio of the power at which a signal is transmitted on the type A symbol to the power at which a signal is transmitted on the type B symbol is 1, a corresponding indicator value Pb is 1; and when the ratio of the power at which a signal is transmitted on the type A symbol to the power at which a signal is transmitted on the type B symbol is 1.25, a corresponding indicator value Pb is 0. In other words, a larger value of Pb indicates a smaller value of a ratio of a power of the type B symbol to a power of the type A symbol.

In an existing technical solution, if a power cannot double during an upgrade from 2T to 4T in a multi-carrier scenario, a power of a CRS may be reduced to ensure that an output power of a radio frequency channel does not exceed a capability of a radio frequency power amplifier. Such a configuration may cause shrinkage of pilot coverage in LTE, and reduce a pilot coverage capability in a multi-antenna technology. According to the technical solutions of this application, during an upgrade from 2T to 4T, it can be ensured that a CRS setting is unchanged, that is, the coverage capability in the multi-antenna technology is unchanged, on a premise that the output power of the radio frequency channel does not exceed the capability of the radio frequency power amplifier. In other words, compared with the multi-antenna (for example, 4T) technology in the existing solution, the multi-antenna (for example, 4T) technology in the technical solutions of this application can improve the pilot coverage capability.

In the existing solution, configurations of Pa and Pb may be modified, so that a power at which a signal is transmitted on a plurality of carriers through radio frequency ports does not exceed the capability of the radio frequency power amplifier. For example, if a bandwidth is 20 MHz and a power is still 20 W and cannot double during the upgrade from 2T to 4T, a CRS may be set to 18.2 dBm and remains unchanged, and Pa=−3 and Pb=1 in 2T may be modified to Pa=−6 and Pb=3. However, such a configuration modification reduces a power of the type B symbol and reduces a power of a control signal, a physical downlink shared channel, or the like on the type B symbol, causing a decrease in a network performance indicator. According to the embodiments of this application, during the upgrade from 2T to 4T in the multi-carrier scenario, the output power of the radio frequency channel can be increased and power utilization can be improved on a premise that the output power of the radio frequency channel does not exceed the capability of the radio frequency power amplifier and network coverage remains unchanged.

Figure 1:
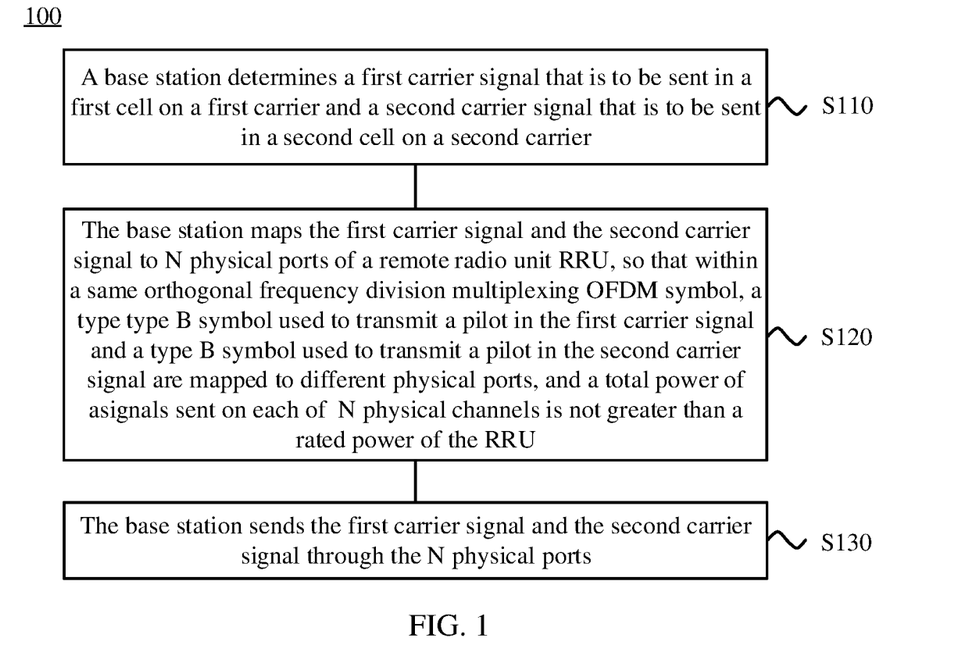
FIG. 1 is a schematic flowchart of a signal transmission method according to an embodiment of this application.

FIG. 1 is a schematic flowchart of a signal transmission method 100 according to an embodiment of this application. The method 100 may be performed by, for example, a base station, and the method may be applied to a multi-carrier communications system having N transmit antennas, where N is an even number greater than or equal to 4.

S110. The base station determines a first carrier signal that is to be sent in a first cell on a first carrier and a second carrier signal that is to be sent in a second cell on a second carrier.

S120. The base station maps the first carrier signal and the second carrier signal to N physical ports of a remote radio unit RRU, so that within a same orthogonal frequency division multiplexing OFDM symbol, a type B symbol that is used to transmit a pilot in the first carrier signal and a type B symbol that is used to transmit a pilot in the second carrier signal are mapped to different physical ports, and a total power of signals sent on each of N physical channels is not greater than a rated power of the RRU.

S130. The base station sends the first carrier signal and the second carrier signal through the N physical ports.

According to the signal transmission method provided in this embodiment of this application, during an upgrade from 2T to 4T, type B symbols that are used to transmit a pilot position in a plurality of carriers are transmitted in a staggered manner within a same OFDM symbol, thereby increasing a power of a network output signal and improving power utilization on a premise that an output power of a radio frequency channel does not exceed a capability of a radio frequency power amplifier and network coverage remains unchanged.

It should be understood that, this embodiment of this application may be applied to a multi-carrier multi-transmit antenna system. In this embodiment of this application, only two carriers are used as an example, but this application is not limited thereto.

It should be further understood that, in this embodiment of this application, the first carrier signal is a signal that is to be sent in the first cell on the first carrier by the base station, and the second carrier signal is a signal that is to be sent in the second cell on the second carrier by the base station, where the first carrier is different from the second carrier.

It should be further understood that, in this embodiment of this application, the first carrier signal may correspond to N antenna ports, the second carrier signal may correspond to N antenna ports, the N physical ports may correspond to N radio frequency channels of the base station, and a quantity of the N antenna ports corresponding to the first carrier signal, a quantity of the N antenna ports corresponding to the second carrier signal, and a quantity of N physical antenna ports may be the same.

It should be further understood that, in the 3GPP LTE protocol, a type A symbol represents a symbol that does not have a pilot position, and a type B symbol represents a symbol that has a pilot position. The type B symbol may further be classified into a type B symbol that is used to transmit a pilot and a type B symbol that is not used to transmit a pilot, and a power of the type B symbol that is used to transmit a pilot is higher than that of the type B symbol that is not used to transmit a pilot.

Optionally, in S120, that the base station maps the first carrier signal and the second carrier signal to N physical ports of a remote radio unit RRU may be: mapping, by the base station, the N antenna ports corresponding to the first carrier signal and the N antenna ports corresponding to the second carrier signal to the N physical ports, so that within the same OFDM symbol, an antenna port for sending the type B symbol that is used to transmit a pilot in the first carrier signal and an antenna port for sending the type B symbol that is not used to transmit a pilot in the second carrier signal are mapped to a same physical port.

Optionally, the base station may preset a mapping relationship of the N antenna ports corresponding to the first carrier signal with the N physical ports and a mapping relationship of the N antenna ports corresponding to the second carrier signal with the N physical ports, so that within the same OFDM symbol, the antenna port for sending the type B symbol that is used to transmit a pilot in the first carrier signal and the antenna port for sending the type B symbol that is not used to transmit a pilot in the second carrier signal are mapped to the same physical port, and the first carrier and the second carrier are mapped to the N physical ports based on the preset mapping relationships. This is not limited in this embodiment of this application.

According to the signal transmission method provided in this embodiment of this application, during an upgrade from 2T to 4T, type B symbols that are used to transmit a pilot position in a plurality of carriers are transmitted in a staggered manner within a same OFDM symbol, thereby increasing a power of a network output signal and improving power utilization on a premise that an output power of a radio frequency channel does not exceed a capability of a radio frequency power amplifier and network coverage remains unchanged.

In an optional embodiment, during the upgrade from 2T to 4T, the mapping, by the base station, the N antenna ports corresponding to the first carrier signal and the N antenna ports corresponding to the second carrier signal to the N physical ports may be: mapping, by the base station, the first antenna port of the first carrier signal and the fourth antenna port of the second carrier signal to the first physical port, mapping the third antenna port of the first carrier signal and the second antenna port of the second carrier signal to the second physical port, mapping the second antenna port of the first carrier signal and the third antenna port of the second carrier signal to the third physical port, and mapping the fourth antenna port of the first carrier signal and the first antenna port of the second carrier signal to the fourth physical port.

It should be understood that, according to pilot patterns of four antenna ports specified in the 3GPP LTE protocol, it can be learned that within one slot, for the antenna ports, type A symbols are sent on OFDM symbols numbered 2/3/5/6, and type B symbols are sent on OFDM symbols numbered 0/1/4, where for an antenna port 0 and an antenna port 1, type B symbols that are used to transmit a pilot are sent on the OFDM symbols numbered 0/4, and type B symbols that are not used to transmit a pilot are sent on the OFDM symbols numbered 1; for an antenna port 2 and an antenna port 3, type B symbols that are used to transmit a pilot are sent on the OFDM symbols numbered 1, and type B symbols that are not used to transmit a pilot are sent on the OFDM symbols numbered 0/4.

Optionally, the base station may preset, based on the pilot patterns of the four antenna ports, the mapping relationship of the N antenna ports corresponding to the first carrier signal with the N physical ports and the mapping relationship of the N antenna ports corresponding to the second carrier signal with the N physical ports, so that within the same OFDM symbol, the type B symbols that are used to transmit a pilot in the first carrier signal and the second carrier signal are sent through different physical ports.

For example, in a multi-carrier 4T scenario, the base station may preset the following: A physical port A corresponds to an antenna port 0 of the first carrier signal and an antenna port 3 of the second carrier signal, a physical port B corresponds to an antenna port 2 of the first carrier signal and an antenna port 1 of the second carrier signal, a physical port C corresponds to an antenna port 1 of the first carrier signal and an antenna port 2 of the second carrier signal, and a physical port D corresponds to an antenna port 3 of the first carrier signal and an antenna port 0 of the second carrier signal.

For another example, in a multi-carrier 4T scenario, the base station may preset the following: A physical port A corresponds to an antenna port 0 of the first carrier signal and an antenna port 2 of the second carrier signal, a physical port B corresponds to an antenna port 2 of the first carrier signal and an antenna port 0 of the second carrier signal, a physical port C corresponds to an antenna port 1 of the first carrier signal and an antenna port 3 of the second carrier signal, and a physical port D corresponds to an antenna port 3 of the first carrier signal and an antenna port 1 of the second carrier signal.

Optionally, before S110, the base station may precode a first baseband signal, to obtain the first carrier signal, and precode a second baseband signal, to obtain the second carrier signal.

In other words, both the first carrier signal and the second carrier signal may be precoded signals.

Optionally, the base station in this embodiment of this application may be an evolved NodeB eNB in Long Term Evolution LTE.

FIG. 2 shows pilot patterns of different ports of four antennas according to an embodiment of this application. Each small grid in FIG. 2 represents one RE, one RB includes 12 REs, and each column is one RB. One small grid represents one OFDM symbol horizontally, and OFDM symbols are numbered sequentially from 0.

In the 3GPP LTE protocol, a type A symbol represents a symbol that does not have a pilot position, and a type B symbol represents a symbol that has a pilot position. In two slots in FIG. 2, one small grid is one RE. A small black grid is used to represent an RE that is a pilot position used to send a pilot; a small shaded grid represents an RE that is a pilot position not used to send a pilot; and a small white grid represents an RE that is used to send a type A or type B signal. A port (port) 0, a port 1, a port 2, and a port 3 represent four antenna ports (antenna port), and FIG. 2-1, FIG. 2-2, FIG. 2-3, and FIG. 2-4 show the pilot patterns of the four antenna ports.

It should be understood that the type B symbol may further be classified into a type B symbol that is used to transmit a pilot and a type B symbol that is not used to transmit a pilot, and a power of the type B symbol that is used to transmit a pilot is higher than that of the type B symbol that is not used to transmit a pilot.

In FIG. 2, a black grid is used to represent an RE that is used to send a pilot, a shaded grid represents an RE that is not used to send a non-pilot or a pilot signal, and a white grid represents an RE that is used to send a non-pilot signal. According to the protocol, at any pilot position, a pilot signal is sent on at least one of the four antenna ports, and neither a non-pilot signal nor a pilot is sent on the other ports.

It should be further understood that, on a same symbol including a pilot position, neither of a first and second baseband signal may be used to send a pilot, for example, on OFDM symbols numbered 1 in the second columns in FIG. 2-1 and FIG. 2-2. In this case, a third and fourth baseband signal may be used to send a pilot signal at a pilot position, for example, on OFDM symbols numbered 1 in the second columns in FIG. 2-3 and FIG. 2-4. In addition, on the same symbol including a pilot position, subcarriers of symbols of the first and the second baseband signal for sending a pilot are different, and a subcarrier at which a symbol used to send a pilot of the first baseband signal is located and a subcarrier at which a symbol used to send a pilot of the second baseband signal is located jointly constitute all subcarriers used for pilot positions on the symbol. For example, in the first column in FIG. 2-1 and FIG. 2-2 each, there are four pilot-position REs in total that can be used to send a pilot, where the first baseband signal in FIG. 2-1 has two REs used to send a pilot, and the second baseband signal in FIG. 2-2 also has two REs used to send a pilot, but locations of the REs used to send a pilot in the two baseband signals do not overlap.

Therefore, for OFDM symbols numbered 0, in the first column in FIG. 2-1, two REs are used to send a pilot, eight REs are used to send a non-pilot type B signal, and two REs are not used to send a non-pilot signal or a pilot. Likewise, for OFDM symbols numbered 0, in the first column in FIG. 2-2, two REs are used to send a pilot, eight REs are used to send a non-pilot type B signal, and two REs are not used to send a non-pilot signal or a pilot. Therefore, on the OFDM symbols numbered 0, powers of antenna ports are the same in FIG. 2-1 and FIG. 2-2. Likewise, on the OFDM symbols numbered 0, a power at which a signal is transmitted is the same on each OFDM symbol in FIG. 2-3 and FIG. 2-4.

According to the pilot patterns of the four antenna ports in FIG. 2, it can be learned that within one slot, for the antenna ports, type A symbols are sent on OFDM symbols numbered 2/3/5/6, and type B symbols are sent on OFDM symbols numbered 0/1/4, where for an antenna port 0 and an antenna port 1, type B symbols that are used to transmit a pilot are sent on the OFDM symbols numbered 0/4, and type B symbols that are not used to transmit a pilot are sent on the OFDM symbols numbered 1; for an antenna port 2 and an antenna port 3, type B symbols that are used to transmit a pilot are sent on the OFDM symbols numbered 1, and type B symbols that are not used to transmit a pilot are sent on the OFDM symbols numbered 0/4.

It should be understood that, after an existing two-carrier 2T network (in which a bandwidth is 20 MHz, a CRS is set to 18.2 dBm, Pa=−3, and Pb=1) is upgraded to two-carrier 4T, to ensure an original network coverage area, the CRS is set to 18.2 dBm, and (Pa, Pb) is set to (−6, 1). As a result, a power of a network output signal exceeds a power amplification capability of a radio frequency channel. To ensure that during the upgrade from the existing 2T to 4T, the power of the network output signal does not exceed the power amplification capability of the radio frequency channel, powers of Pa and Pb need to be decreased, and therefore the CRS in the 4T network is set to 18.2 dBm, and (Pa, Pb) is set to (−6, 3).

Table 1 shows configuration information of the upgrade of the existing two-carrier 2T network (in which the bandwidth is 20 MHz, the CRS is set to 18.2 dBm, and (Pa, Pb)=(−3, 1)) and the upgraded two-carrier 4T network (in which the bandwidth is 20 MHz, the CRS is set to 18.2 dBm, and (Pa, Pb)=(−6, 3)).

improve the data channel performance on a premise that the power amplification capability of the radio frequency channel is utilized to a greatest extent.

Figure 3:
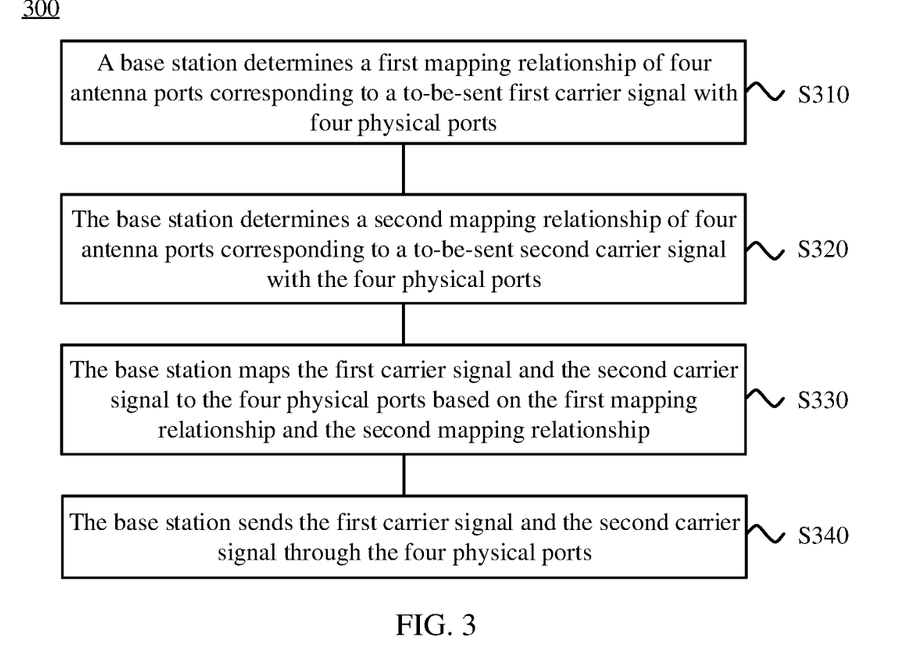
FIG. 3 is a schematic flowchart of another signal transmission method according to an embodiment of this application.

FIG. 3 is a schematic flowchart of another signal transmission method according to an embodiment of this application. The signal transmission method described in FIG. 3 may be performed by, for example, a base station. It should be understood that, in this embodiment of this application, only an upgrade from a two-carrier 2T network (in which CRS=18.2 dBm, Pa=3, and Pb=1) to a two-carrier 4T network (in which CRS=18.2 dBm, Pa=−6, and Pb=1) is used as an example to describe this embodiment of this application in detail, but this embodiment of this application is not limited thereto.

S310. The base station determines a first mapping relationship of four antenna ports corresponding to a to-be-sent first carrier signal with four physical ports.

It is assumed that the four antenna ports corresponding to the first carrier signal are: an antenna port 10, an antenna port 11, an antenna port 12, and an antenna port 13.

It is assumed that the four physical ports are: a physical port A, a physical port B, a physical port C, and a physical port D.

Specifically, the first mapping relationship is as follows: The antenna port 10 is mapped to the physical port A, the antenna port 12 is mapped to the physical port B, the antenna

TABLE 1

| | | Single-channel power | Antenna port | Type B 0/7 | Type B 1/8 | Type A 2/9 | Type A 3/10 | Type B 4/11 | Type A 5/12 | Type A 6/13 |
|---|---|---|---|---|---|---|---|---|---|---|
| 2T configuration | Carrier 1 | 40 W | 0/1 | 40 W | 40 W | 40 W | 40 W | 40 W | 40 W | 40 W |
| | Carrier 2 | 40 W | 0/1 | 40 W | 40 W | 40 W | 40 W | 40 W | 40 W | 40 W |
| 4T configuration | Carrier 1 | 20 W | 0/1 | 19.85 W | *9.96 W* | 19.92 W | 19.92 W | 19.85 W | 19.92 W | 19.92 W |
| | | | 2/3 | *9.96 W* | 19.85 W | 19.92 W | 19.92 W | *9.96 W* | 19.92 W | 19.92 W |
| | Carrier 2 | 20 W | 0/1 | 19.85 W | *9.96 W* | 19.92 W | 19.92 W | 19.85 W | 19.92 W | 19.92 W |
| | | | 2/3 | *9.96 W* | 19.85 W | 19.92 W | 19.92 W | *9.96 W* | 19.92 W | 19.92 W |
| | Total for the two carriers | 40 W | 0/1 | 39.70 W | 19.92 W | 39.84 W | 39.84 W | 39.70 W | 39.84 W | 39.84 W |
| | | | 2/3 | 19.92 W | 39.70 W | 39.84 W | 39.84 W | 19.92 W | 39.84 W | 39.84 W |

As shown in Table 1, after the 2T network is upgraded to the 4T network, for carrier 1, because a power (for example, a figure in italics in Table 1) of a symbol on which a type B symbol that is not used to transmit a pilot is located is lower than a power (for example, a figure in bold in Table 1) of a symbol on which a type B symbol that is used to transmit a pilot is located, if a maximum output power that can be provided by an RRU is 40 W, in the 4T configuration shown in Table 1, a base station may transmit, within a same OFDM symbol, type B symbols that are not used to transmit a pilot in two carrier signals. In this case, a power at an output end of the radio frequency channel is only 19.92 W, which is far lower than a rated power of the radio frequency channel. Consequently, power utilization is relatively low and data channel performance deteriorates.

According to the signal transmission method in this embodiment of this application, in the existing 4T scenario described in Table 1, a configuration of Pb is increased, so that the CRS in the 4T network is set to 18.2 dBm, and (Pa, Pb) is set to (−6, 1). In addition, type B symbols that are not used to transmit a pilot in two carriers are sent in a staggered manner within a same OFDM symbol. Compared with the existing 4T, the method can increase an output power of the radio frequency channel, improve power utilization, and port 11 is mapped to the physical port C, and the antenna port 13 is mapped to the physical port D.

It should be understood that, the first carrier signal may be a signal that is to be sent in a first cell on a first carrier by the base station through the four antenna ports by using four physical antennas.

S320. The base station determines a second mapping relationship of four antenna ports corresponding to a to-be-sent second carrier signal with the four physical ports.

It is assumed that the four antenna ports corresponding to the second carrier signal are: an antenna port 20, an antenna port 21, an antenna port 22, and an antenna port 23.

Specifically, the second mapping relationship is as follows: The antenna port 23 is mapped to the physical port A, the antenna port 21 is mapped to the physical port B, the antenna port 22 is mapped to the physical port C, and the antenna port 20 is mapped to the physical port D.

It should be understood that, the second carrier signal may be a signal that is to be sent in a second cell on a second carrier by the base station through the four antenna ports by using the same four physical antennas as the first carrier signal, where the first carrier and the second carrier have different carrier frequencies.

S330. The base station maps the first carrier signal and the second carrier signal to the four physical ports based on the first mapping relationship and the second mapping relationship.

Specifically, that the base station maps the first carrier signal and the second carrier signal to N physical ports based on the first mapping relationship and the second mapping relationship means that the base station sends a signal in the antenna port 10 and a signal in the antenna port 23 through the physical port A, sends a signal in the antenna port 12 and a signal in the antenna port 21 through the physical port B, sends a signal in the antenna port 11 and a signal in the antenna port 22 through the physical port C, and sends a signal in the antenna port 13 and a signal in the antenna port 20 through the physical port D.

S340. The base station sends the first carrier signal and the second carrier signal through the four physical ports.

It should be understood that, the four physical ports may correspond to four radio frequency channels of the base station, and the base station may send the first carrier signal and the second carrier signal on the four radio frequency channels.

According to the technical solution of this application, configuration information of a 4T (in which CRS=18.2 dBm, Pa=−6, and Pb=1) network shown in Table 2 can be obtained.

Figure 4:
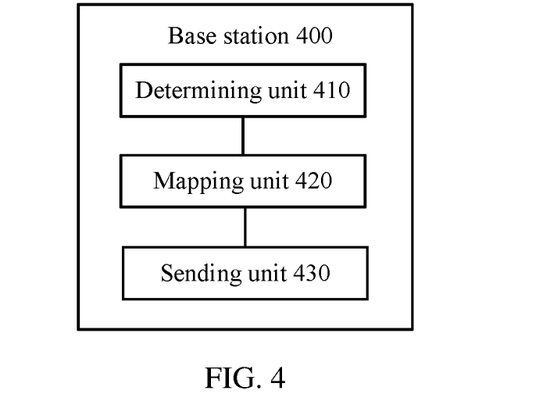
FIG. 4 is a schematic block diagram of a base station according to an embodiment of this application.

The determining unit 410 is configured to determine a first carrier signal that is to be sent in a first cell on a first carrier and a second carrier signal that is to be sent in a second cell on a second carrier.

The mapping unit 420 is configured to map the first carrier signal and the second carrier signal that are determined by the determining unit 410 to N physical ports of a remote radio unit RRU, so that within a same orthogonal frequency division multiplexing OFDM symbol, a type B symbol that is used to transmit a pilot in the first carrier signal and a type B symbol that is used to transmit a pilot in the second carrier signal are mapped to different physical ports, and a total power of signals sent on each of N physical channels is not greater than a rated power of the RRU.

The sending unit 430 is configured to send the first carrier signal and the second carrier signal through the N physical ports mapped by the mapping unit 420.

According to the base station provided in this embodiment of this application, during an upgrade from 2T to 4T, type B symbols that are used to transmit a pilot position in a plurality of carriers are transmitted in a staggered manner within a same OFDM symbol, thereby increasing a power of a network output signal and improving power utilization on a premise that an output power of a radio frequency channel does not exceed a capability of a radio frequency power amplifier and network coverage remains unchanged.

TABLE 2

|  | Single-channel power | Physical channel | Antenna channel | Type B 0/7 | Type B 1/8 | Type A 2/9 | Type A 3/10 | Type B 4/11 | Type A 5/12 | Type A 6/13 |
| --- | --- | --- | --- | --- | --- | --- | --- | --- | --- | --- |
| Carrier 1 | 20 W | A | 0 | 26.49 W | *13.28 W* | 19.92 W | 19.92 W | 26.49 W | 19.92 W | 19.92 W |
|  |  | B | 2 | *13.28 W* | 26.49 W | 19.92 W | 19.92 W | *13.28 W* | 19.92 W | 19.92 W |
|  |  | C | 1 | 26.49 W | *13.28 W* | 19.92 W | 19.92 W | 26.49 W | 19.92 W | 19.92 W |
|  |  | D | 3 | *13.28 W* | 26.49 W | 19.92 W | 19.92 W | *13.28 W* | 19.92 W | 19.92 W |
| Carrier 2 | 20 W | A | 3 | *13.28 W* | 26.49 W | 19.92 W | 19.92 W | *13.28 W* | 19.92 W | 19.92 W |
|  |  | B | 1 | 26.49 W | *13.28 W* | 19.92 W | 19.92 W | 26.49 W | 19.92 W | 19.92 W |
|  |  | C | 2 | *13.28 W* | 26.49 W | 19.92 W | 19.92 W | *13.28 W* | 19.92 W | 19.92 W |
|  |  | D | 0 | 26.49 W | *13.28 W* | 19.92 W | 19.92 W | 26.49 W | 19.92 W | 19.92 W |
| Total for the two carriers | 40 W | A | | 39.77 W | 39.77 W | 39.84 W | 39.84 W | 39.77 W | 39.84 W | 39.84 W |
|  |  | B | | 39.77 W | 39.77 W | 39.84 W | 39.84 W | 39.77 W | 39.84 W | 39.84 W |
|  |  | C | | 39.77 W | 39.77 W | 39.84 W | 39.84 W | 39.77 W | 39.84 W | 39.84 W |
|  |  | D | | 39.77 W | 39.77 W | 39.84 W | 39.84 W | 39.77 W | 39.84 W | 39.84 W |

As shown in Table 2, after the 2T network is upgraded to the 4T network, for carrier 1, because a power (for example, a figure in italics in Table 2) of a type B symbol that is not used to transmit a pilot is lower than a power (for example, a figure in bold in Table 2) of a type B symbol that is used to transmit a pilot, if a maximum output power that can be provided by an RRU is 40 W, in the 4T configuration shown in Table 2, the base station sends, in a staggered manner within a same OFDM symbol, type B symbols that are used to transmit a pilot in two carrier signals. In this case, a power at an output end of a network radio frequency channel can reach 39.77 W, thereby utilizing a rated power of the radio frequency channel to a greatest extent, and improving data channel performance.

Figure 5:
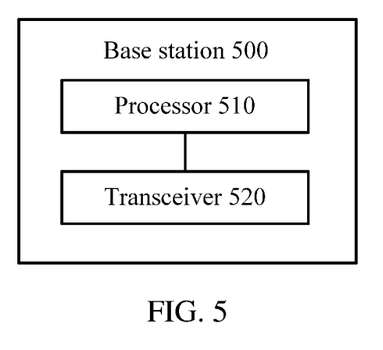
FIG. 5 is a schematic block diagram of another base station according to an embodiment of this application.
Figure 21:
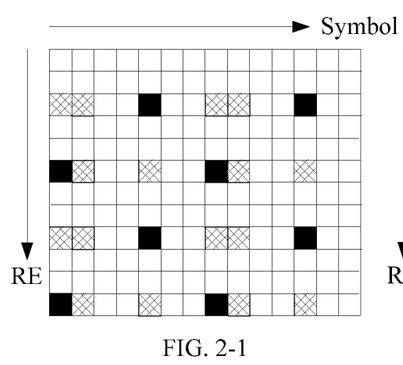
Figure 22:
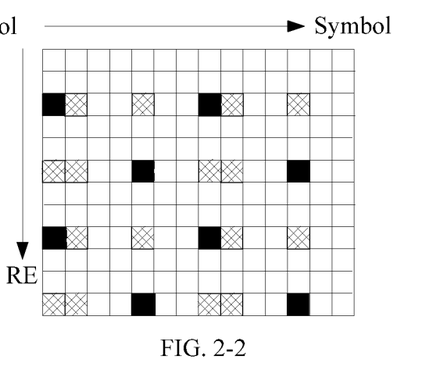
Figure 23:
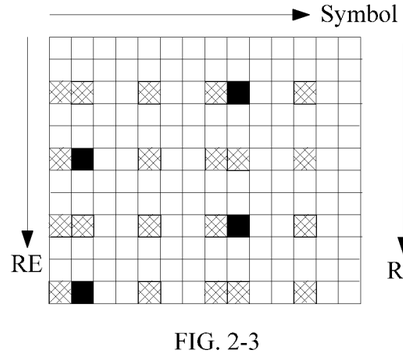
Figure 24:
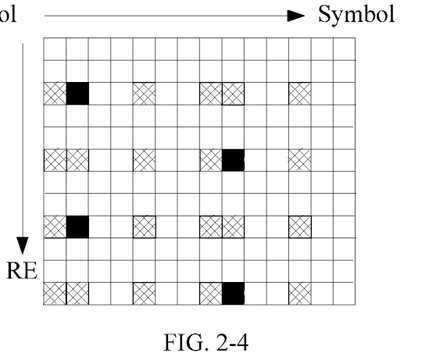

The foregoing describes the signal transmission method according to the embodiments of this application in detail with reference to FIG. 1 to FIG. 3, and the following describes the base station according to the embodiments of this application with reference to FIG. 4 and FIG. 5.

FIG. 4 is a schematic block diagram of a base station 400 according to an embodiment of this application. The base station 400 in FIG. 4 includes a determining unit 410, a mapping unit 420, and a sending unit 430.

Optionally, the first carrier signal corresponds to N antenna ports, and the second carrier signal corresponds to N antenna ports; and the mapping unit is specifically configured to: map the N antenna ports corresponding to the first carrier signal and the N antenna ports corresponding to the second carrier signal to the N physical ports, so that within the same OFDM symbol, an antenna port for sending the type B symbol that is used to transmit a pilot in the first carrier signal and an antenna port for sending a type B symbol that is not used to transmit a pilot in the second carrier signal are mapped to a same physical port.

Optionally, when 2T is upgraded to 4T, the mapping unit is specifically configured to: map the first antenna port of the first carrier signal and the fourth antenna port of the second carrier signal to the first physical port, map the third antenna port of the first carrier signal and the second antenna port of the second carrier signal to the second physical port, map the second antenna port of the first carrier signal and the third antenna port of the second carrier signal to the third physical port, and map the fourth antenna port of the first carrier signal and the first antenna port of the second carrier signal to the fourth physical port.

Optionally, the base station may further include a processing unit, and the processing unit is configured to: before the first carrier signal that is to be sent in the first cell on the first carrier and the second carrier signal that is to be sent in the second cell on the second carrier are determined, precode a first baseband signal, to obtain the first carrier signal, and precode a second baseband signal, to obtain the second carrier signal.

Optionally, the base station is an evolved NodeB eNB in Long Term Evolution LTE.

In an optional example, persons skilled in the art may understand that the base station 400 may be specifically the base station in the foregoing embodiment 100 and the method embodiment 300, and the base station 400 may be configured to perform various procedures and/or steps corresponding to the base station in the foregoing method embodiment 100 and the method embodiment 300. To avoid repetition, details are not described herein again.

FIG. 5 is a schematic block diagram of a base station 500 according to an embodiment of this application. As shown in FIG. 5, the base station 500 includes a processor 510 and a transceiver 520.

The processor 510 is configured to determine a first carrier signal that is to be sent in a first cell on a first carrier and a second carrier signal that is to be sent in a second cell on a second carrier, and map the first carrier signal and the second carrier signal to N physical ports of a remote radio unit RRU, so that within a same orthogonal frequency division multiplexing OFDM symbol, a type B symbol that is used to transmit a pilot in the first carrier signal and a type B symbol that is used to transmit a pilot in the second carrier signal are mapped to different physical ports, and a total power of signals sent on each of N physical channels is not greater than a rated power of the RRU.

The transceiver 520 is configured to send the first carrier signal and the second carrier signal through the N physical ports.

In an optional embodiment, persons skilled in the art may understand that the base station 500 may be configured to perform various procedures and/or steps corresponding to the base station in the foregoing method embodiment 100 and the method embodiment 300. To avoid repetition, details are not described herein again.

Optionally, the base station 500 may further include a memory, where the memory may include a read-only memory and a random access memory, and provide the processor with an instruction and data. A part of the memory may further include a non-volatile random access memory. For example, the memory may further store information of a device type. The processor 510 may be configured to execute an instruction stored in the memory, and when executing the instruction, the processor may perform various steps corresponding to the base station in the foregoing method embodiments.

It should be understood that in the embodiment of this application, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

In an implementation process, steps in the foregoing methods can be implemented by using a hardware integrated logical circuit in the processor, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and the processor performs the instructions in the memory and implements the steps in the foregoing methods in combination with hardware of the processor. To avoid repetition, details are not described herein again.

It should be understood that, the term "and/or" in this specification describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method, comprising:
   determining, by a base station, a first carrier signal to be sent in a first cell on a first carrier;
   determining, by the base station, a second carrier signal to be sent in a second cell on a second carrier;
   mapping, by the base station, the first carrier signal and the second carrier signal to N physical ports of a remote radio unit (RRU), wherein the mapping is performed in a manner that within a same orthogonal frequency division multiplexing (OFDM) symbol, a type B symbol that is allocated for transmitting a pilot in the first carrier signal and a type B symbol that is allocated for transmitting a pilot in the second carrier signal are mapped to different physical ports, and a total power of signals sent on each of N physical channels is not greater than a rated power of the RRU; and
   sending, by the base station, the first carrier signal and the second carrier signal through the N physical ports.

2. The method according to claim 1, wherein the first carrier signal corresponds to N antenna ports, and the second carrier signal corresponds to N antenna ports; and
   wherein mapping, by the base station, the first carrier signal and the second carrier signal to the N physical ports of the RRU comprises:
      mapping, by the base station, the N antenna ports corresponding to the first carrier signal and the N antenna ports corresponding to the second carrier signal to the N physical ports, wherein the mapping is performed in a manner that within the same OFDM symbol, an antenna port for sending the type B symbol allocated for transmitting the pilot in the first carrier signal and an antenna port for sending a type B symbol allocated for transmitting a signal other than a pilot signal in the second carrier signal are mapped to a same physical port.

3. The method according to claim 2, wherein N is 4, and mapping, by the base station, the N antenna ports corresponding to the first carrier signal and the N antenna ports corresponding to the second carrier signal to the N physical ports comprises:
   mapping, by the base station, a first antenna port of the first carrier signal and a fourth antenna port of the second carrier signal to a first physical port;
   mapping, by the base station, a third antenna port of the first carrier signal and a second antenna port of the second carrier signal to a second physical port;
   mapping, by the base station, a second antenna port of the first carrier signal and a third antenna port of the second carrier signal to a third physical port; and
   mapping, by the base station, a fourth antenna port of the first carrier signal and a first antenna port of the second carrier signal to a fourth physical port.

4. The method according to claim 1, wherein before determining, by the base station, the first carrier signal to be sent in the first cell on the first carrier, and determining, by the base station, the second carrier signal to be sent in the second cell on the second carrier, the method further comprises:
   precoding, by the base station, a first baseband signal, to obtain the first carrier signal; and
   precoding, by the base station, a second baseband signal, to obtain the second carrier signal.

5. The method according to claim 1, wherein the base station is an evolved NodeB (eNB) in Long Term Evolution (LTE).

6. A base station, comprising:
   a processor; and
   a non-transitory computer-readable storage medium storing a program to be executed by the processor, the program including instructions for:
      determining a first carrier signal to be sent in a first cell on a first carrier;
      determining a second carrier signal to be sent in a second cell on a second carrier;
      mapping the first carrier signal and the second carrier signal to N physical ports of a remote radio unit (RRU), wherein the mapping is performed in a manner that within a same orthogonal frequency division multiplexing (OFDM) symbol, a type B symbol that is allocated for transmitting a pilot in the first carrier signal and a type B symbol that is allocated for transmitting a pilot in the second carrier signal are mapped to different physical ports, and a total power of signals sent on each of N physical channels is not greater than a rated power of the RRU; and
      sending, the first carrier signal and the second carrier signal through the N physical ports.

7. The base station according to claim 6, wherein the first carrier signal corresponds to N antenna ports, and the second carrier signal corresponds to N antenna ports; and
   wherein the program includes instructions for:
      mapping the N antenna ports corresponding to the first carrier signal and the N antenna ports corresponding to the second carrier signal to the N physical ports, wherein the mapping is performed in a manner that within the same OFDM symbol, an antenna port for sending the type B symbol allocated for transmitting a pilot in the first carrier signal and an antenna port for sending another type B symbol allocated for transmitting a signal other than a pilot signal in the second carrier signal are mapped to a same physical port.

8. The base station according to claim 7, wherein N is 4, and the program includes instructions for:
mapping, a first antenna port of the first carrier signal and a fourth antenna port of the second carrier signal to a first physical port;
mapping a third antenna port of the first carrier signal and a second antenna port of the second carrier signal to a second physical port;
mapping a second antenna port of the first carrier signal and a third antenna port of the second carrier signal to a third physical port; and
mapping a fourth antenna port of the first carrier signal and a first antenna port of the second carrier signal to a fourth physical port.

9. The base station according to claim 6, wherein the program further includes instructions for:
before the first carrier signal to be sent in the first cell on the first carrier is determined, and before the second carrier signal to be sent in the second cell on the second carrier is determined:
precoding, a first baseband signal to obtain the first carrier signal; and
precoding a second baseband signal to obtain the second carrier signal.

10. The base station according to claim 6, wherein the base station is an evolved NodeB (eNB) in Long Term Evolution (LTE).

11. A non-transitory computer readable storage medium storing instructions, wherein the instructions are executable by a processor to:
determine a first carrier signal to be sent in a first cell on a first carrier;
determine a second carrier signal to be sent in a second cell on a second carrier;
map the first carrier signal and the second carrier signal to N physical ports of a remote radio unit (RRU), wherein the mapping is performed in a manner that within a same orthogonal frequency division multiplexing (OFDM) symbol, a type B symbol that is allocated for transmitting a pilot in the first carrier signal and a type B symbol that is allocated for transmitting a pilot in the second carrier signal are mapped to different physical ports, and a total power of signals sent on each of N physical channels is not greater than a rated power of the RRU; and
send the first carrier signal and the second carrier signal through the N physical ports.

12. The non-transitory computer readable storage medium according to claim 11, wherein the first carrier signal corresponds to N antenna ports, and the second carrier signal corresponds to N antenna ports; and
wherein mapping the first carrier signal and the second carrier signal to the N physical ports of the RRU comprises:
mapping the N antenna ports corresponding to the first carrier signal and the N antenna ports corresponding to the second carrier signal to the N physical ports, wherein the mapping is performed in a manner that within the same OFDM symbol, an antenna port for sending the type B symbol allocated for transmitting the pilot in the first carrier signal and an antenna port for sending a type B symbol allocated for transmitting a signal other than a pilot signal in the second carrier signal are mapped to a same physical port.

13. The non-transitory computer readable storage medium according to claim 12, wherein N is 4, and mapping the N antenna ports corresponding to the first carrier signal and the N antenna ports corresponding to the second carrier signal to the N physical ports comprises:
mapping a first antenna port of the first carrier signal and a fourth antenna port of the second carrier signal to a first physical port;
mapping a third antenna port of the first carrier signal and a second antenna port of the second carrier signal to a second physical port;
mapping a second antenna port of the first carrier signal and a third antenna port of the second carrier signal to a third physical port; and
mapping a fourth antenna port of the first carrier signal and a first antenna port of the second carrier signal to a fourth physical port.

14. The non-transitory computer readable storage medium according to claim 11, wherein the instructions are further executable by the processor to:
precode a first baseband signal, to obtain the first carrier signal; and
precode a second baseband signal, to obtain the second carrier signal.

15. The non-transitory computer readable storage medium according to claim 11, wherein the non-transitory computer readable storage medium is comprised in an evolved NodeB (eNB) in Long Term Evolution (LTE).

* * * * *